US007061427B2

(12) United States Patent
Hoffmann et al.

(10) Patent No.: US 7,061,427 B2
(45) Date of Patent: Jun. 13, 2006

(54) DIRECTIONAL ANTENNA PHYSICAL LAYER STEERING FOR WLAN

(75) Inventors: John E. Hoffmann, Indialantic, FL (US); George Rodney Nelson, Jr., Merritt Island, FL (US); John A. Regnier, Palm Bay, FL (US); Kevin P. Johnson, Palm Bay, FL (US)

(73) Assignee: IPR Licensing, Inc., Wilmington, DE (US)

( * ) Notice: Subject to any disclaimer, the term of this patent is extended or adjusted under 35 U.S.C. 154(b) by 297 days.

(21) Appl. No.: 10/675,583

(22) Filed: Sep. 30, 2003
(Under 37 CFR 1.47)

(65) Prior Publication Data

US 2004/0130487 A1 Jul. 8, 2004

Related U.S. Application Data

(60) Provisional application No. 60/414,947, filed on Sep. 30, 2002, provisional application No. 60/415,847, filed on Oct. 3, 2002.

(51) Int. Cl.
*H04B 7/00* (2006.01)

(52) U.S. Cl. .................................... 342/367; 455/277.2

(58) Field of Classification Search ................ 342/367; 455/277.2

See application file for complete search history.

(56) References Cited

U.S. PATENT DOCUMENTS

| | | | | |
|---|---|---|---|---|
| 5,530,926 | A * | 6/1996 | Rozanski | 455/277.2 |
| 5,748,676 | A * | 5/1998 | Mahany | 375/260 |
| 6,304,215 | B1 * | 10/2001 | Proctor et al. | 342/372 |
| 6,456,675 | B1 * | 9/2002 | Wagner et al. | 375/347 |
| 2003/0119468 | A1 * | 6/2003 | Meehan et al. | 455/277.2 |

OTHER PUBLICATIONS

Kalis, Antonis et al, "Relative Direction Determination in Mobile Computing Networks," IEEE Instrumentation and Measurement Tech Conf, Budapest, May 2001, pp. 1479-1484.*

IEEE Std 802.11a-1999 (Part 11 : Wireless LAN Medium Access Control (MAC) and Physical Layer (PHY) Specifications High Speed Physical Layer in 5 GHz Band, 1999, pp. 1-83.*

* cited by examiner

*Primary Examiner*—Gregory C. Issing
(74) *Attorney, Agent, or Firm*—Hamilton, Brook, Smith & Reynolds, P.C.

(57) ABSTRACT

A technique for steering a directional antenna such as may be used in a Wireless Local Area Network (WLAN) device. The technique detects signal parameters during reception of short sync pulses in the very beginning portion of a Packet Protocol Data Unit (PPDU) frame. As a result, the antenna can be steered to an optimum direction for reception prior to receiving other portions of a preamble that may be needed to acquire carrier signal phase and frequency.

12 Claims, 14 Drawing Sheets

DIRECTIONAL ANTENNA PHYSICAL LAYER STEERING FOR WLAN

RELATED APPLICATION

This application claims the benefit of U.S. Provisional Application No. 60/414,947 filed Sep. 30, 2002 and U.S. Provisional Application No. 60/415,847 filed Oct. 3, 2002. The entire teachings of the above applications are incorporated herein by reference.

BACKGROUND OF THE INVENTION

Wireless Local Area Network (WLAN) equipment continues to be used as a solution for many different data connectivity applications. WLANs are now viewed as an ideal solution for providing access to wireless equipped personal computers within home networks, mobile access to laptop computers and personal digital assistants (PDAs), as well as providing robust and convenient access in business applications.

Indeed, at the present time many laptop computers are shipped from the factory with WLAN interface cards. Certain microprocessor manufacturers, such as Intel, have also announced intentions to incorporate WLAN capability directly into processor chip platforms. These and other initiatives will continue to drive the integration of WLAN equipment into personal computers of all types.

It is already the case that in many cities, WLAN access equipment operating in accordance with the IEEE 802.11a, 802.11b, and 802.11g standards is in wide use. In these cities one can now find "hot spots" that provide network connectivity. Unfortunately, having tens, if not hundreds, of closely spaced wireless networks using the same radio spectrum means that interference becomes a problem. That is, although the 802.11 standards provide for robust signaling in the form of spread spectrum radio frequency modulation, and using orthogonal frequency division multiplexing over modulated subcarriers, crowding of the radio spectrum still increases noise and therefore decreases performance for all users.

It is recognized that directional antenna arrays can be used to steer radio frequency energy between a transmitter and receiver. This greatly reduces the amount of interference that would otherwise be created for concurrent users of the spectrum. The use of such arrays in wireless subscriber equipment has been described in U.S. Pat. No. 6,100,843 entitled "Adaptive Antenna for Use in Same Frequency Networks"; U.S. Pat. No. 6,400,317 entitled "Methods and Apparatus for Antenna Control in a Communications Network"; and in U.S. Pat. No. 6,473,036 entitled "Method Apparatus for Adapting Antenna Array to Reduce Adaptation Time While Increasing Array Performance". Each of these patents is assigned to Tantivity Communications, Inc., the assignee of the present application.

However, WLAN signaling has special considerations in that communication is expected to be on a peer-to-peer basis with extremely short packet lengths. It has heretofore been thought quite difficult to require WLAN subscriber equipment to steer an antenna array, to one of many possible candidate angles, during such very short intervals.

SUMMARY OF THE INVENTION

The present invention is a technique for implementing an antenna steering at the physical layer of a Wireless Local Area Network (WLAN) device. Implementing the antenna steering decision at the physical layer eliminates involving higher communication layers, which would otherwise require modification of standardized communication processing software, such as the Media Access Control (MAC) or Link layers.

In one embodiment, the invention provides techniques for signal detection during short sync symbol reception in the very beginning of a preamble portion of a WLAN frame. Specifically, in the context of an 802.11a or 802.11g Packet Protocol Data Unit (PPDU) frame (packet), this may be concluded within only a few initial training sequence symbols of the Physical Layer Convergent Procedure (PLCP) preamble portion. Operating very quickly during these so-called short sync pulses, the antenna will be steered to an optimum direction prior to receiving other portions of the preamble. This permits the radio receiver equipment to use the remainder of the preamble to acquire carrier phase lock and frequency synchronization, in just about the same manner as if no directional antennal were present. The remaining preamble portions can thus be processed according to standard WLAN frame processing.

One specific technique employed is to set an antenna array to an omnidirectional mode prior to reception of the first short sync pulse. This permits Automatic Gain Control (AGC) circuitry in the receiver to track for an initial short sync pulse. During reception of the next one or two short sync pulses, a signal metric such as a correlation is used to evaluate the observed response against an expected response. The expected response can either be a stored response that is the optimum expected for a short sync. Alternatively, the expected response can be a stored version of a measured response received with an omni setting during the initial short sync pulse.

In accordance with certain other aspects of the invention, correlations can be performed over a first and second half of a short sync pulse by swapping real and imaginary samples. This provides twice as many candidate angles to be tested for each subsequent short sync pulse.

With either of these two techniques, by the time of arrival of the fourth short sync pulse, the antenna array has been steered to a candidate direction. This provides at least five to six additional short sync pulses that may be used by the receiver to acquire frequency and phase lock.

A third technique involves the use of finite impulse response comb filtering. This may be performed through the use of inverse Fast Fourier Transforms. The process here is to implement an ideal comb type filter response for both signal and noise and then convolve it with the received short sync signal. An approximate estimate of a signal to noise ratio can be derived as a ratio of observed signal and noise filter responses. The candidate angle exhibiting the strongest signal to noise ratio is then selected to be used.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The present invention is implemented as an antenna steering algorithm typically in the base band physical layer signal processor of a Wireless Local Area Network (WLAN) receiver. Specifically, the invention involves various techniques to try candidate antenna settings in response to receiving one or more very short duration synchronization pulses that typically make up an initial portion of a preamble. A metric is used to evaluate the candidate responses, and an antenna setting is then stabilized for reception of the remaining portions of the preamble as well as the traffic portion of a protocol data unit (frame). The invention thus does not require modification of higher layer processing components such as the Media Access Control (MAC) layer to perform antenna optimization for each received packet.

Figure 1:
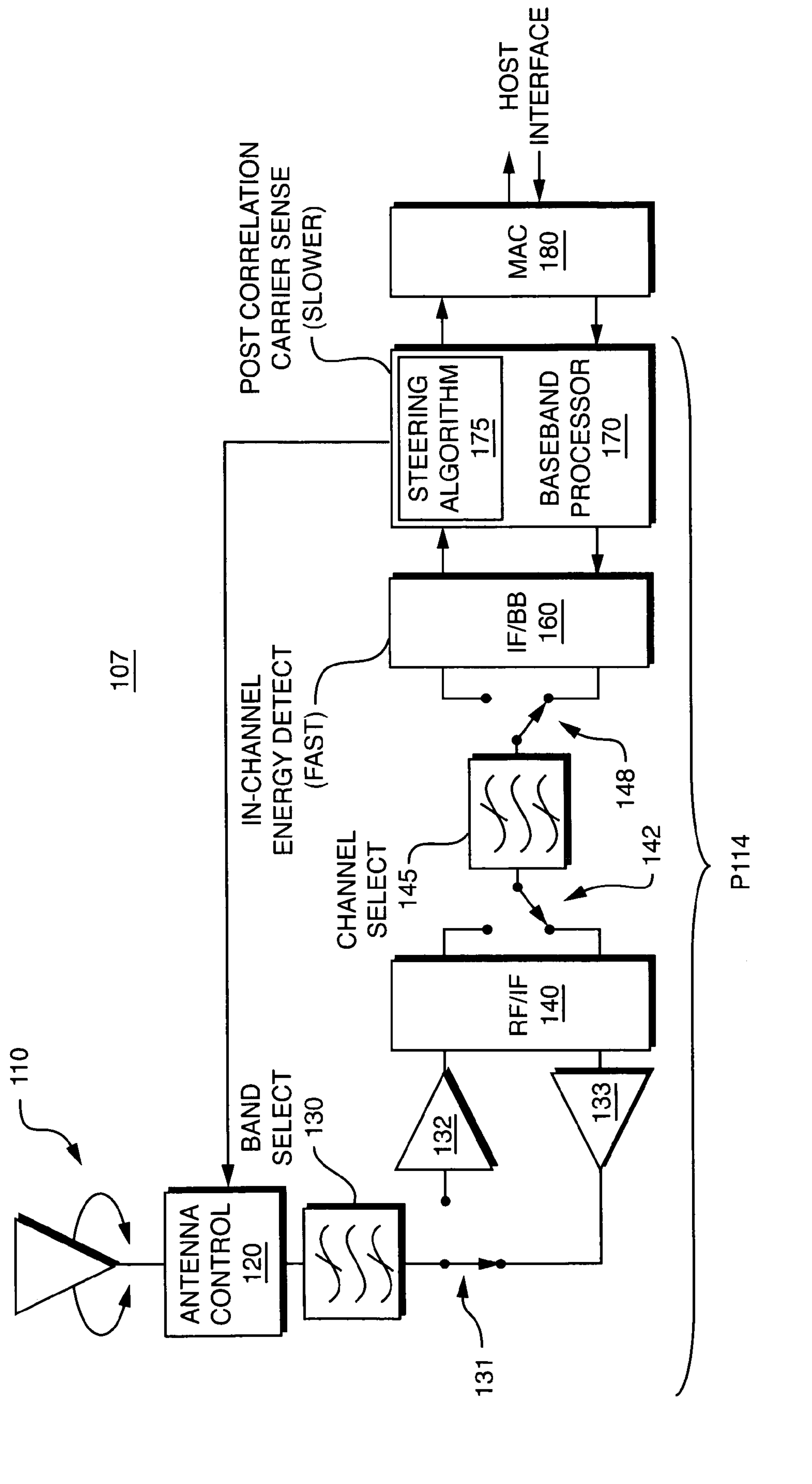
FIG. 1 is a block diagram of a typical wireless local area network (WLAN) receiver showing the location of implementation of an antenna steering algorithm according to the present invention.

FIG. 1 illustrates a block diagram of a Wireless Local Area Network (WLAN) transceiver which includes a directional antenna 110, antenna controller 120, band select filter 130, Radio Frequency/Intermediate Frequency (RF/IF) circuitry 140, associated amplifiers 132, 133 and switches 131, channel select filter 145, associated switches 142, 148, Intermediate Frequency/Base Band (IF/BB) circuits 160, Base Band processor 170, and Media Access Control (MAC) layer processor 180.

The band select 130, RF/IF 140 and IF/BB 160 operate in conjunction with the base band processor 170, in accordance with known techniques, to implement the physical layer (PHY) of the WLAN protocol. For example, these components may implement a physical layer such as specified by the Institute for Electrical and Electronic Engineers' (IEEE) 802.11a Standard. This standard specifically provides for a physical layer that implements wireless data transmission in an unlicensed radio band at 5.15 through 5.825 GigaHertz (GHz). Using spread spectrum signaling, in particular orthogonal frequency division multiplexing, payload data rates from 6 through 54 Megabits per second (Mbps) can be provided. Modulation schemes that are implemented in 802.11a include binary phase shift keying, quadrative phase shift keying 16 QAM and 64 QAM, with convolutional coding of one-half, two-thirds, or three-quarter rates.

What is important to note here is that the equipment 100 includes a directional antenna array 110 that may be steered to a number of different azimuthol angles. Through the use of the steerable array 110, it is possible to increase the selectivity of the base band processor 120 thereby improving the performance (that is rejection of unwanted signals and noise) of the equipment 100. An antenna controller 120 forms part of the physical layer processor in order to permit setting the array 110 at one of N angles. The steering algorithm 175 implemented in the base band processor 170 selects candidate angles to try during an initial processing phase. The candidate angles are evaluated by the steering algorithm 175 with the antenna controller setting the array 110 in a fixed condition for reception of the remainder of the Packet Protocol Data Unit (PPDU) frame. The invention thus accomplishes this without making modifications to the MAC layer 180 or higher level layers with the communication protocol that would be implemented by an associated computer host (not shown).

Figure 2:
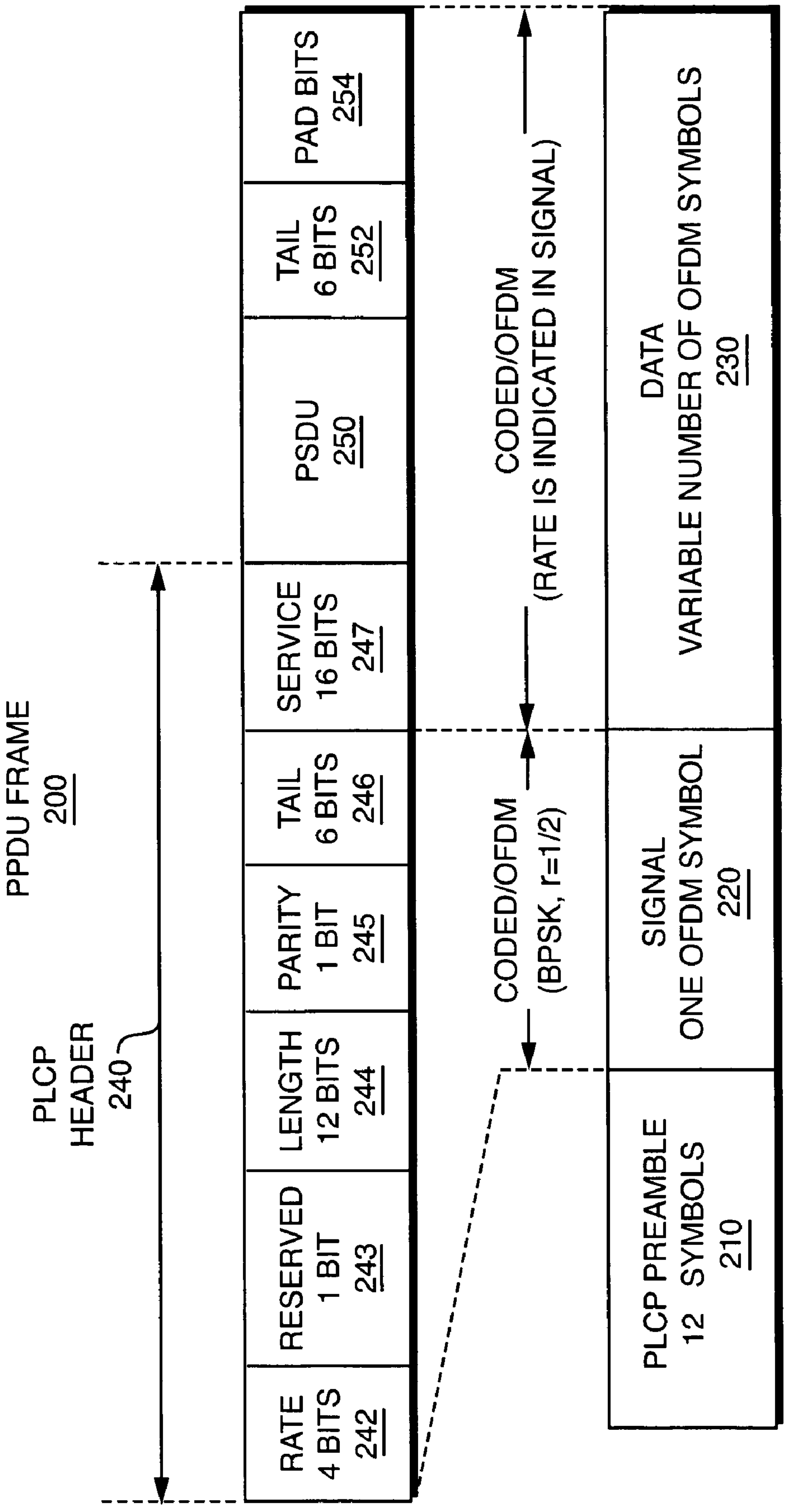
FIG. 2 is a high level diagram of a Packet Protocol Data Unit (PPDU) used in an 802.11a or 802.11g network.

Before describing in detail how a steering algorithm 175 is implemented, it is important to understand the format of a PPDU frame. The format of one such frame is shown in FIG. 2. Here the PPDU frame 200 is seen to include a Physical Layer Convergent Procedure (PLCP) preamble portion 210, a signal portion 220, and a data portion 230. The PLCP preamble 210 consists of twelve Orthogonal Frequency Division Multiplex (OFDM) symbols; these symbols will be described in much greater detail below. The signal portion 220 consists of one symbol as shown in the more detailed view of the PLCP header 240. These include a number of bits coded as Binary Phase Shift Keyed (BPSK) at a half rate including a rate field 242, a reserved bit 243, a length bit 244, a parity bit 245, a tail bit section 246 and service bit section 247. A data portion 230 more particularly includes the Protocol Service Data Unit (PSDU) fields 250 that include the actual payload data, a tail portion 252 and pad bits 254.

Figure 3:
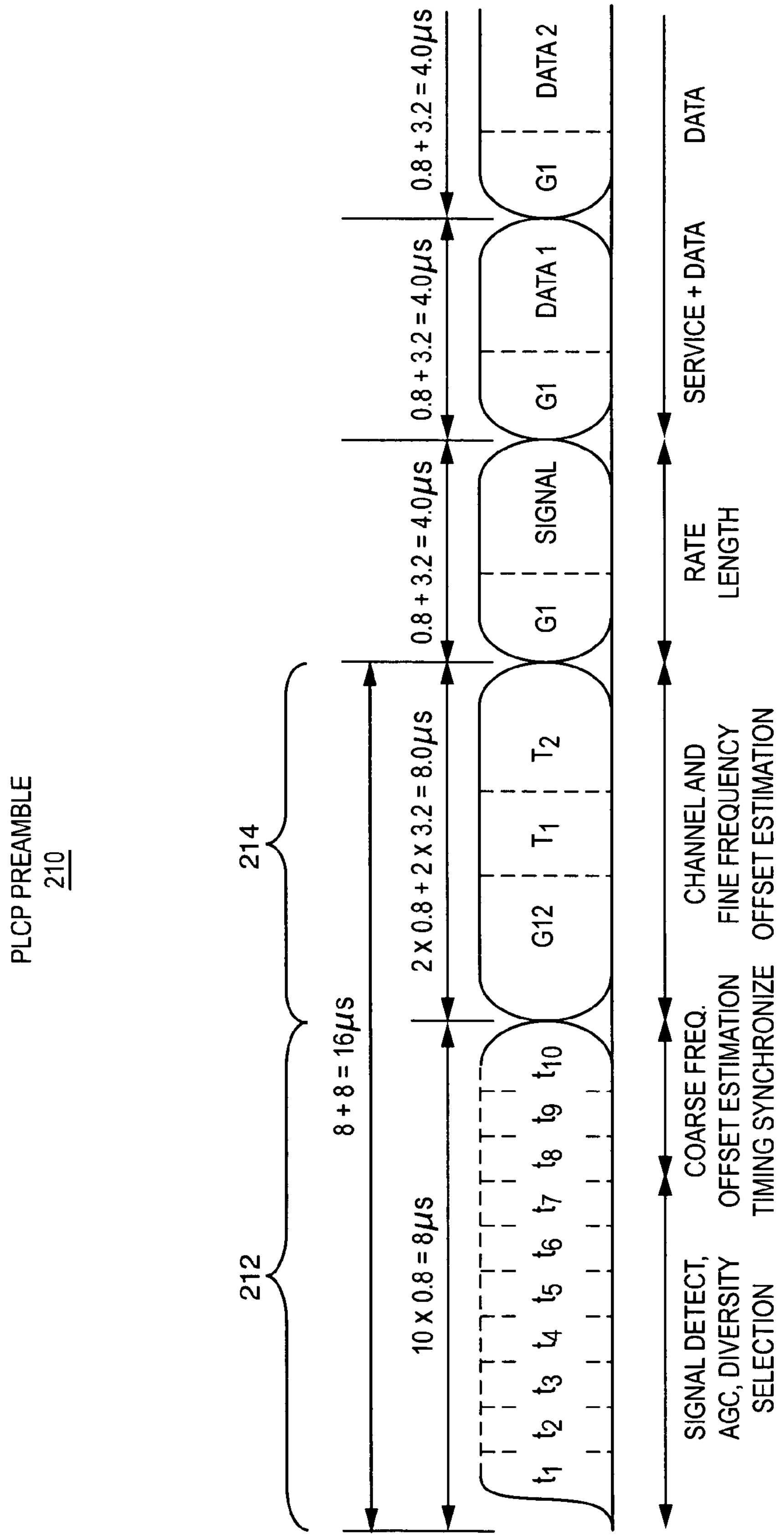
FIG. 3 is a more detailed view of the preamble portion of the header.

FIG. 3 is a more detailed view of the PLCP preamble portion and in particular, a training sequence that occurs in a beginning portion. The PLCP preamble 120 includes short and long training sequences consisting of a number of samples that permit a receiver to perform signal detection, automatic gain control, diversity selection, course frequency adjustment, and timing synchronization as well as fine frequency and in timing offset estimation. The rate field 245 and message length field 244 permit decoding of the remainder of the frame by indicating its encoding data rate and length in terms of symbols. The PSDU field 250 is the convolutionally encoded and scrambled payload data. The tail bits 252 are bits required for the convolutional decoder decoding process to converge to a known zero state and the pad bits 254 extend the message to fit evenly into a fixed integer number of OFDM symbols.

FIG. 3 also shows the format of the PLCP preamble 210. Here can be seen the short synchronization (short sync) section 212 and long sync section 214. The short sync section 212 consists of ten short sync symbols, $t_1, t_2 \ldots t_{10}$, each having a duration of 800 nanoseconds (providing an aggregate duration of 8 microseconds (μs)). According to the IEEE 802.11a specification, signal detection, automatic gain control, and diversity selection is expected to be performed by approximately the occurrence of the seventh short sync symbol $t_7$. Course frequency offset estimation and timing synchronization then proceeds on the remaining three to four symbols at the end of the short sync sequence.

A double guard band GI2 is provided prior to the inclusion of two long sync symbols $T_1$ and $T_2$. The entire duration of the long sync portion of the preamble 214 is 8.0 microseconds as was in the case of the short sync symbol section. What is important to note here is that there is not a particularly long amount of time available to steer an antenna array at the beginning of the PLCP preamble. For example, by time $t_7$ or by at least by the time $t_8$, it is expected that the receiver will already be performing course frequency offset estimation. Thus, if an antenna array is to be steered such that it is optimized for each received PPDU frame, the steering must be completed, and the antenna may not be further steered or "spinning" after approximately $t_6$. Otherwise, the receiver will be prone to not properly obtaining course frequency and timing synchronization, never mind not being able to perform fine frequency and timing offset synchronization needed to properly decode the data symbols occurring later in the frame.

FIG. 4 is a diagram illustrating the real and imaginary portions of a short sync portion of the PLCP preamble. The short sync pulses 212 each consist of a known burst of energy in both the real and imaginary data planes. (The X-axis here is based on sample number and not specifically the time duration.) It should be noted that time duration of 8 microseconds corresponds to receipt of approximately 160 samples at a 20 MHz complex sample rate.

Figure 5:
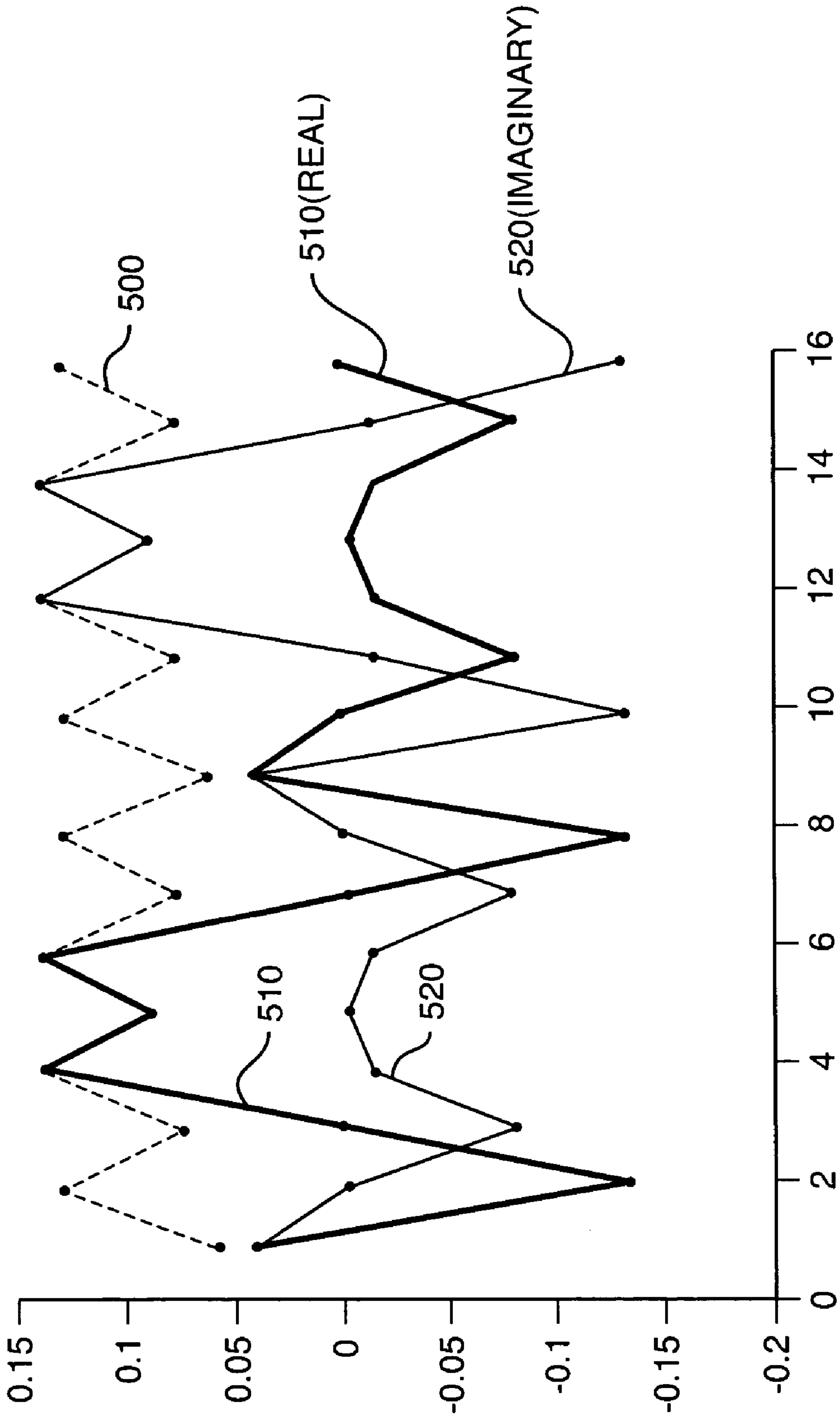
FIG. 5 is a more detailed view of the short sync pulse showing the real and imaginary parts, as well as a magnitude portion.

FIG. 5 is a more detailed view of a single PLCP short sync pulse in the time domain. Shown here are sixteen (16) samples taken across the symbol duration of 800 nanoseconds (that is, at a rate of 50 nanoseconds per complex sample or 20 MegaHertz). The dashed part going across the top of the page represents the complex magnitude of the PLCP short sync pulse. The plot 510 in the heavier shaded line represents the real portion of that same short sync pulse; the lighter weight line 520 indicates the imaginary portion of the short sync pulse.

What can be noted from this diagram is that symmetry exists between samples 1 through 8 and samples 9 through 16. Specifically, the first portion of the real part (i.e., samples 1 through 8) corresponds to the second portion of the imaginary part (samples 9 through 16). Likewise, the second portion of the real part (samples 9 through 16) corresponds to the first portion of the imaginary part, (samples 1 through 8). This symmetry is indicative of several techniques that may be used to shorten processing needed to probably detect a short sync pulse. Specifically, as long as one can track at least one half of a short sync pulse, then it should be possible to properly detect it, since the second half is redundant, in a sense. This characteristic of a short sync pulse can be further exploited in a manner that can be described in greater detail below in connection with the steering algorithm.

Figure 6:
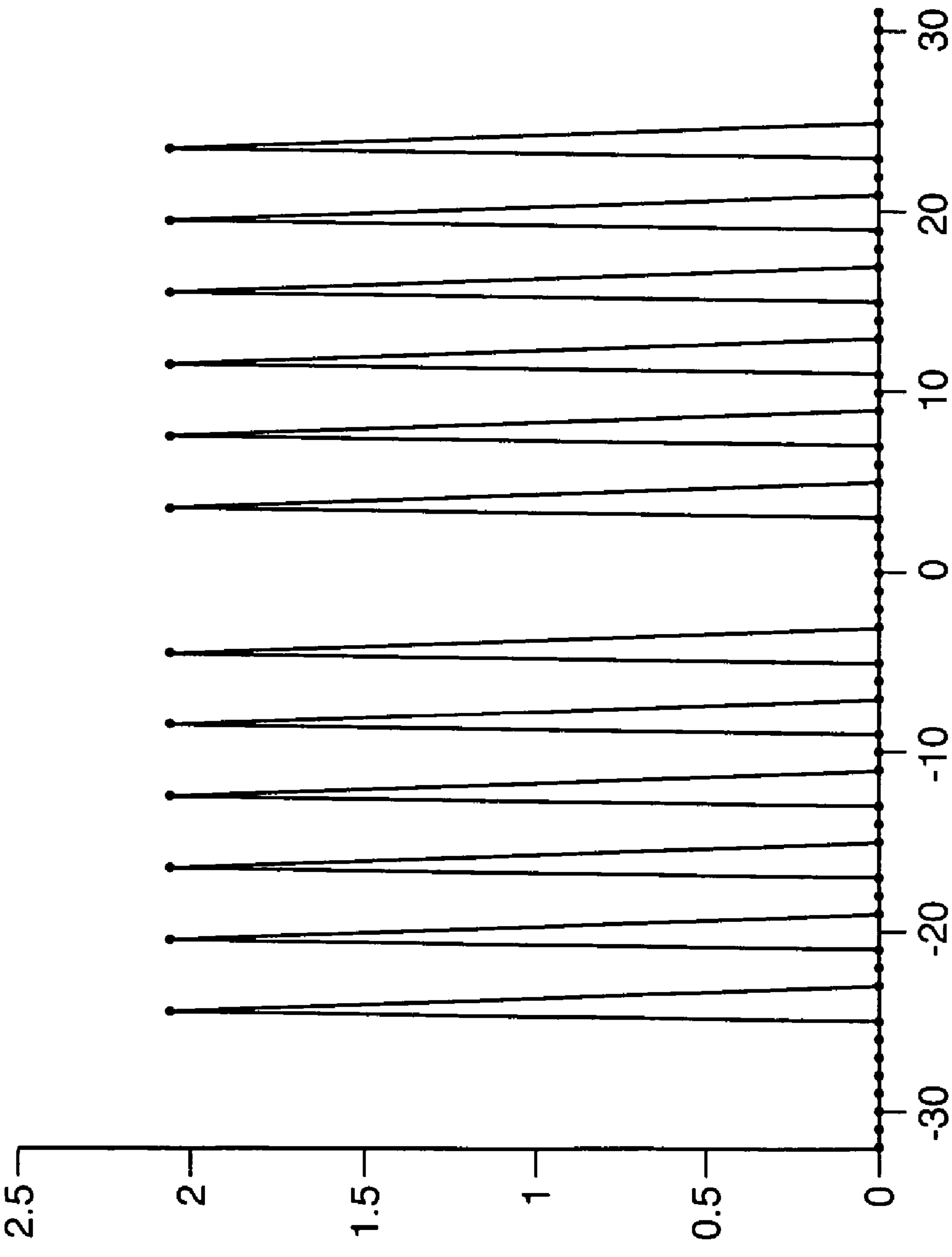
FIG. 6 is a frequency domain plot of the magnitude of the short sync pulse.

FIG. 6 is a diagram illustrating the frequency domain magnitude response of a short sync pulse over 64 samples. As can be seen, the frequency content exists in twelve fixed "expected" bins. There is no expected energy in the remaining 52 bins. This particular response will be used in connection with one aspect of the steering algorithm to determine a metric as an approximation of a signal to noise ratio given an observed actual short sync detected pulse.

Figure 7:
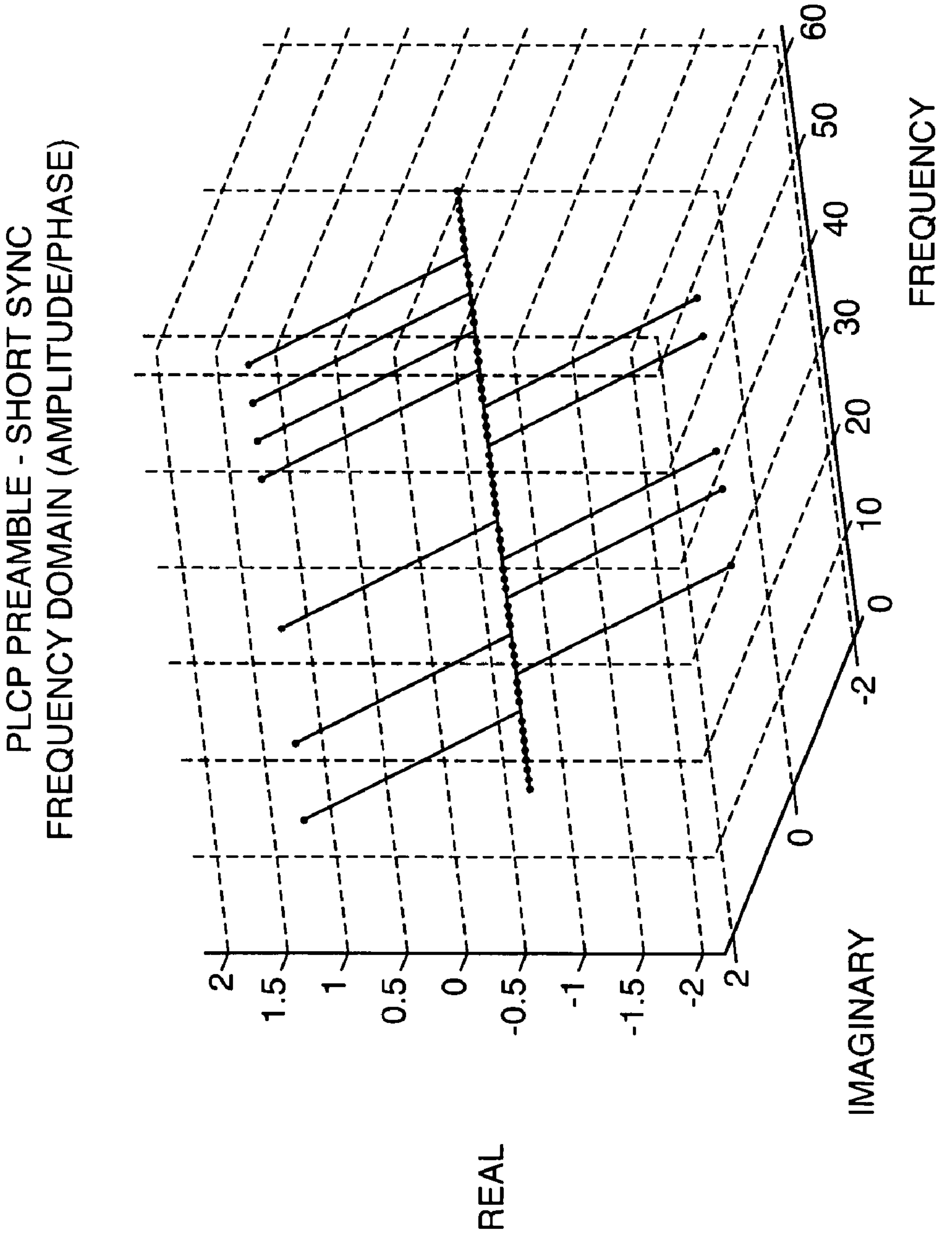
FIG. 7 is a three-dimensional view showing the frequency to main amplitude and phase response of the short sync pulse in the frequency domain.

FIG. 7 is a frequency domain amplitude and phase plot for the short sync preamble pulse showing the relative phases of the 12 energy bins that comprise the pulse.

Figure 8:
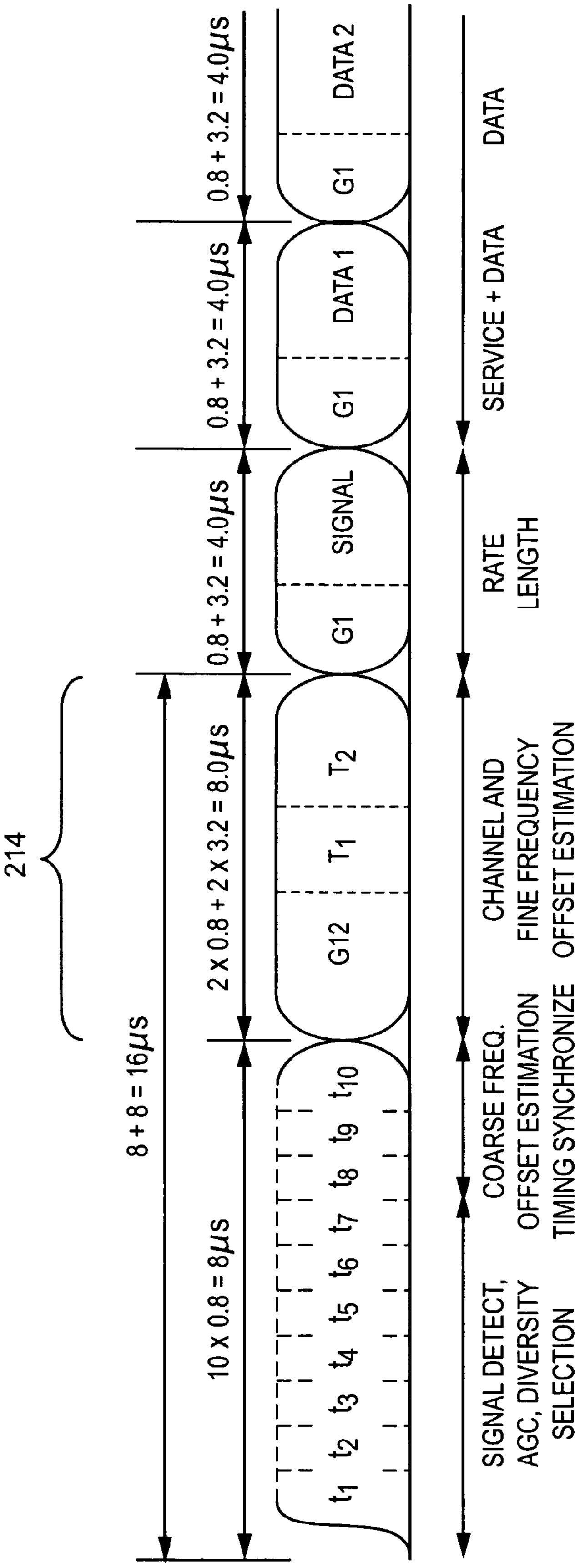
FIG. 8 is another representation of the preamble portion of a PPDU.
Figure 10:
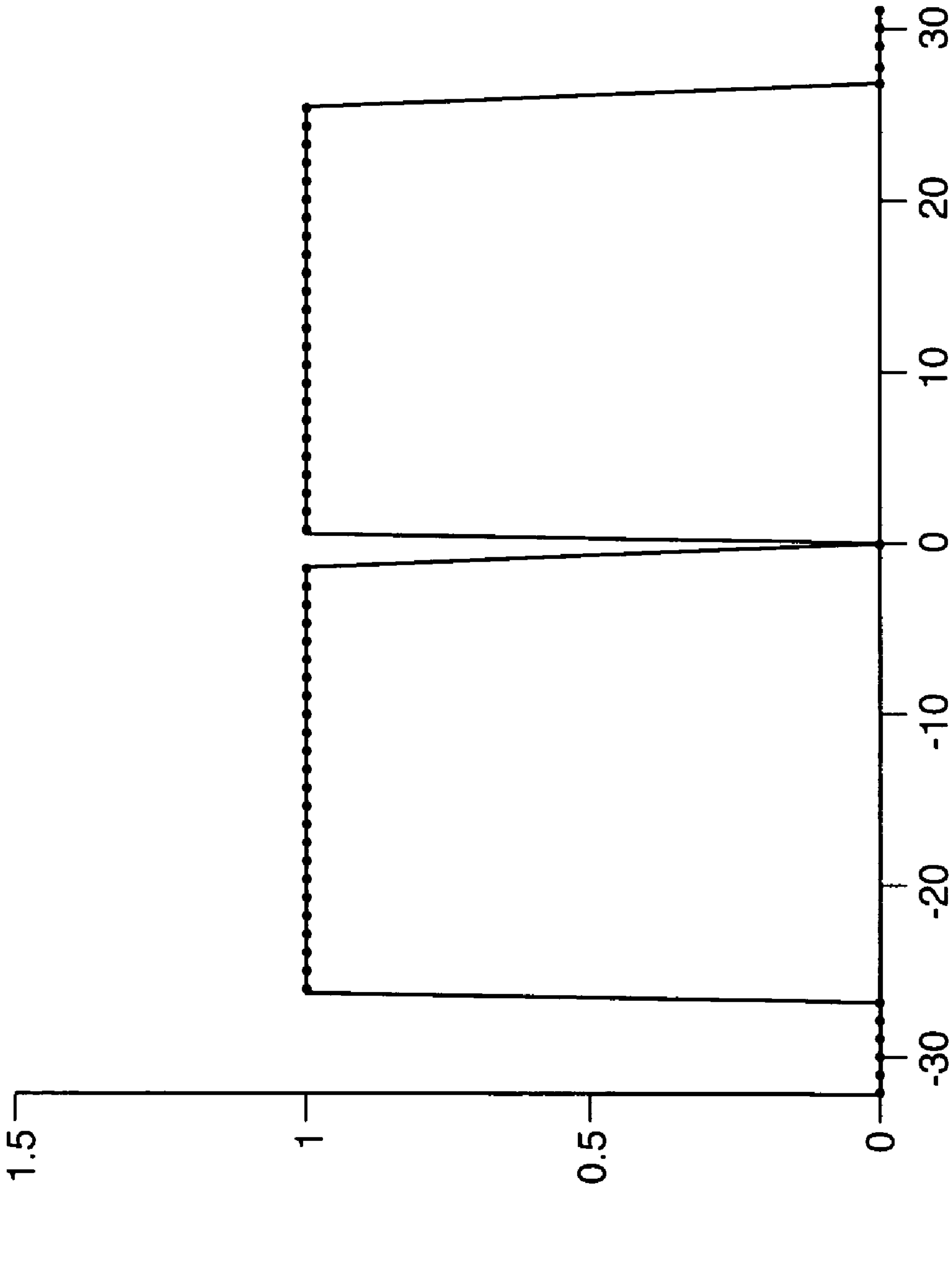
FIG. 10 is a plot of magnitude in the frequency domain for the long sync pulse.
Figure 11:
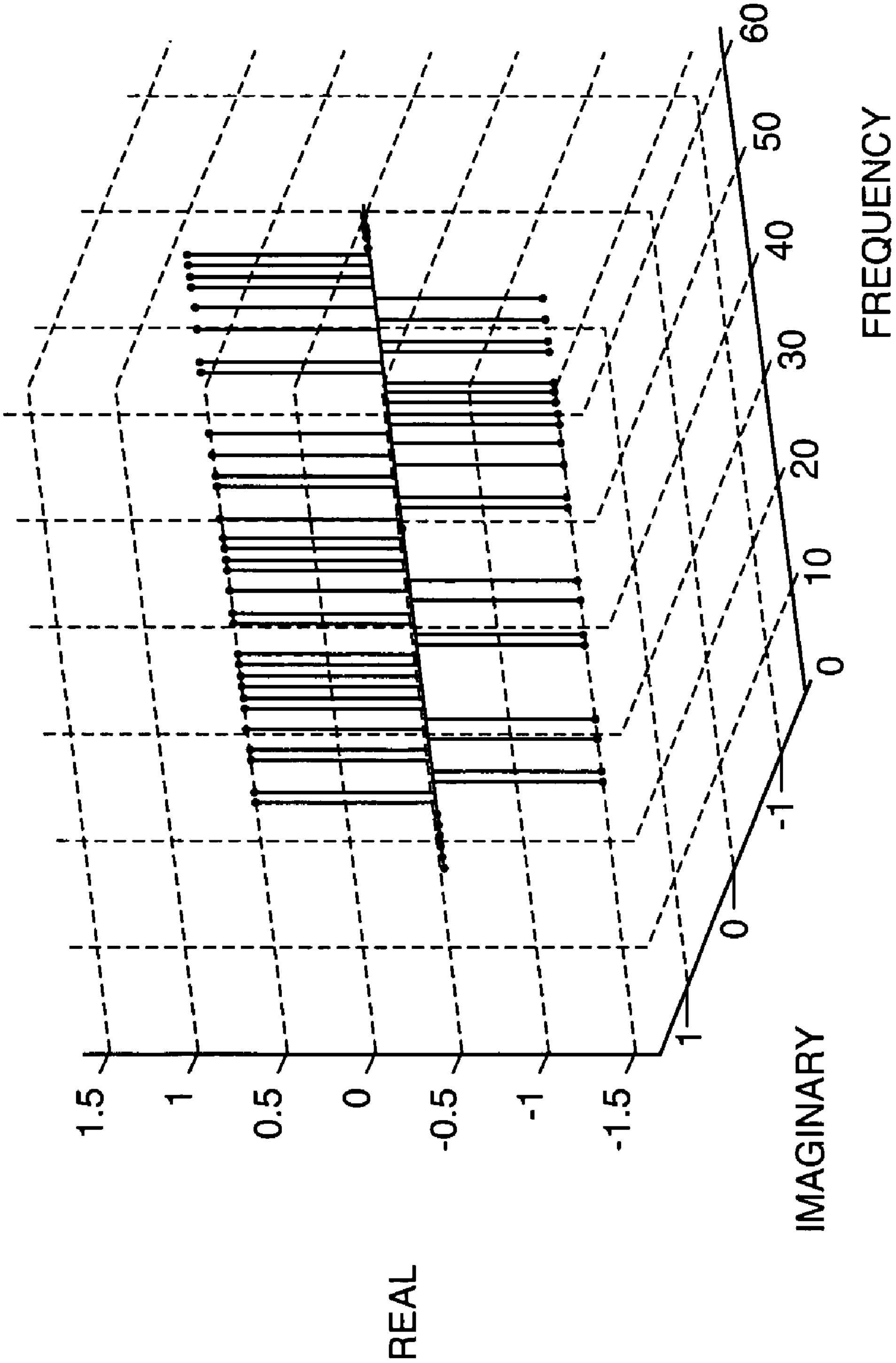
FIG. 11 is a frequency domain amplitude and phase diagram for the long sync pulse.

FIG. 8 is included here as a reminder of the format of the long sync pulses $T_1$, $T_2$. These pulses occur during the long sync portion 242, and are used primarily for phase estimation and fine frequency acquisition processing. The long sync pulse is formatted in the time domain as shown in FIG. 9. The frequency domain response shown in FIG. 10. A sample plot showing the complex real and imaginary frequency domain characteristic of the long sync pulse is shown in FIG. 11. This plot is included to show that the frequency domain magnitude response of the long sync pulse is such that energy occurs in each frequency bin, at least with the 64 samples that would be available. It would thus be difficult to generate an estimated signal to noise ratio or other metrics from such a pulse.

It is important to also note here that at the time of reception of the long sync pulse, a receiver is expected to be performing a fine tuning operation. At this point it is also probably too late to therefore be changing the antenna directional settings.

Thus what is needed is a technique for steering the antenna on the short sync pulses 212 only. In general, these algorithms must be performed as quickly as possible, as the time available is only a few microseconds. Furthermore, the algorithm must work in synchronization with signal acquisition processing, such that a result is obtained prior to any long sync or fine frequency estimation processing required for each packet. It should also be understood that these algorithms operate with antennas that can be steered with extremely small latency time, less than one microsecond, or approximately the duration of one short sync pulse.

Figure 12:
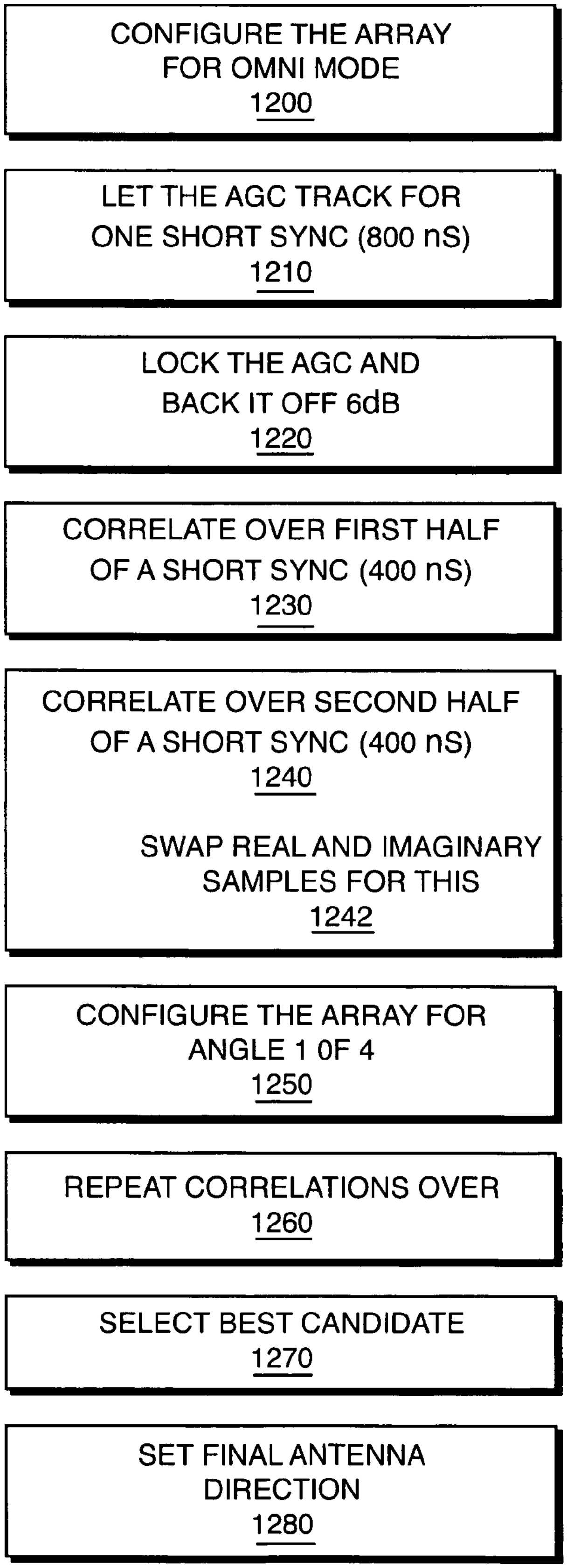
FIG. 12 is a high level structured English description of one embodiment of the physical layer steering algorithm.

A first steering algorithm 175 shown in FIG. 12 proceeds as follows. In a first step 1200, the array 110 is configured for an omnidirectional receiving mode. This preferably completes prior to reception of even the first short sync pulse. In the next step 1210, the Automatic Gain Control (AGC) circuitry of the receiver is allowed to track for the duration of the first short sync pulse ($t_1$). In the case of 802.11a, this will be for a duration of 800 nanoseconds (ns). At step 1212 the AGC is locked and the set amount is dropped off by six decibels.

In the next step 1230, a metric is determined. This can, in one embodiment, be a correlation performed over the first half of the short sync pulse, i.e., the first 400 nanoseconds of pulse $t_2$ (FIG. 3), but other metrics are possible. The correlation is performed such that the detected $t_2$ pulse is compared against an ideal expected version. The correlation thus provides a measure of how well the short sync pulse has been received at the candidate angle. A second correlation is then performed over the second half of the short sync pulse in state 1240.

In state 1242 the real and imaginary samples are swapped during this second correlation step. This then gives a baseline for an omnidirectional response.

In state 1250 the array 110 is steered for a first candidate angle out of a number of candidate angles. The number of candidate angles depends upon the configuration of the antenna array; in one embodiment there are four candidate angles. From state 1260, the correlation steps 1230, 1240 and 1242 are repeated for each of the four candidate angles, with correlation results being stored for each candidate angle. The candidate angle that provided the best correlation result is then selected as the angle to be used for the remainder of short sync and the remainder of PPDU processing. This angle is selected in state 1270, and in state

1280 the candidate antenna direction is set. The steering algorithm of FIG. 12 can thus be completed in as little as six short sync pulses. This permits additional receiver processing, such as frequency estimation, to operate on the four or so remaining short sync pulses $T_7$ through $T_{10}$ after the antenna has reached a stable setting.

Because of the in-phase and quadrative symmetry of each short sync pulse, it is possible to perform a correlation over a second half of a short sync pulse, using a different candidate angle than used for the first half. However, this assumes that the antenna array can be steered to a new candidate angle in about 30 to 200 nanoseconds. It also assumes that the correlation can be completed in such a timeframe. When this is possible, the algorithm can determine a correlation value for two different candidate angles for every short sync pulse. Determination of which embodiment is best for a particular implementation depends upon the availability of high speed correlation hardware and fast switching antenna components.

Figure 13:
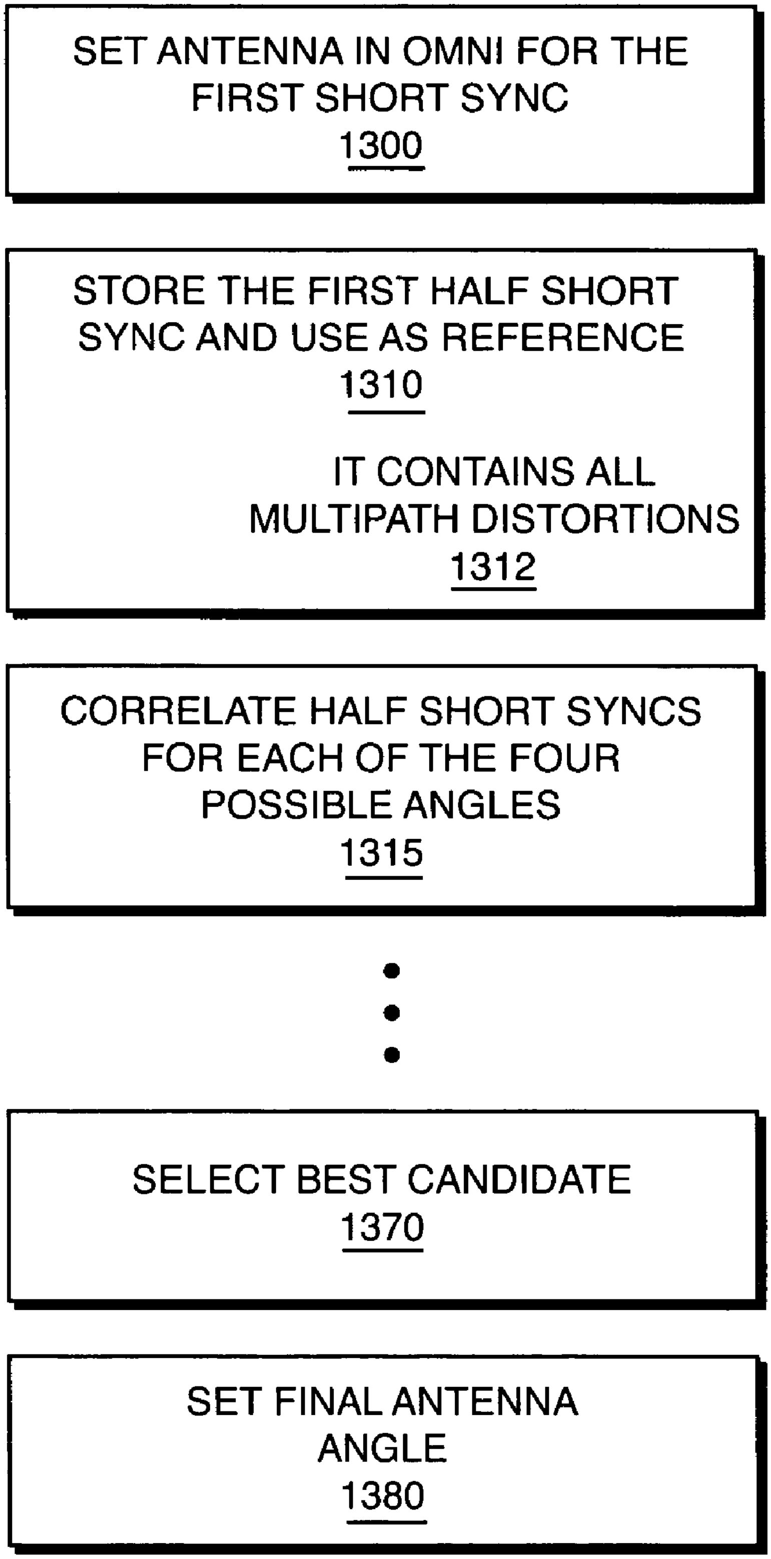
FIG. 13 is a structured English description of a second embodiment.

A second technique used for antenna steering algorithm 175 is described in FIG. 13. This process is similar to that shown in FIG. 12. From state 1300, the system sets the antenna in omnidirectional mode for reception of a first short sync pulse $t_1$. In state 1310, rather than correlate against an optimized expected short sync response, an actual first half and second half short sync response are stored in states 1310 and 1315. These references are stored for use in later calculation of the correlation of four possible angles. The actual response will contain multipath distortion information, which can be potentially beneficial over a technique that uses only ideal responses. Otherwise the process here proceeds after state 1315 as in FIG. 12, to perform an AGC track and correlate over first and second half portions of a short sync pulse (if desired) for each of the four candidate angles. The best candidate angle is selected in state 1370, and the final antenna angle set in state 1380.

Figure 14:
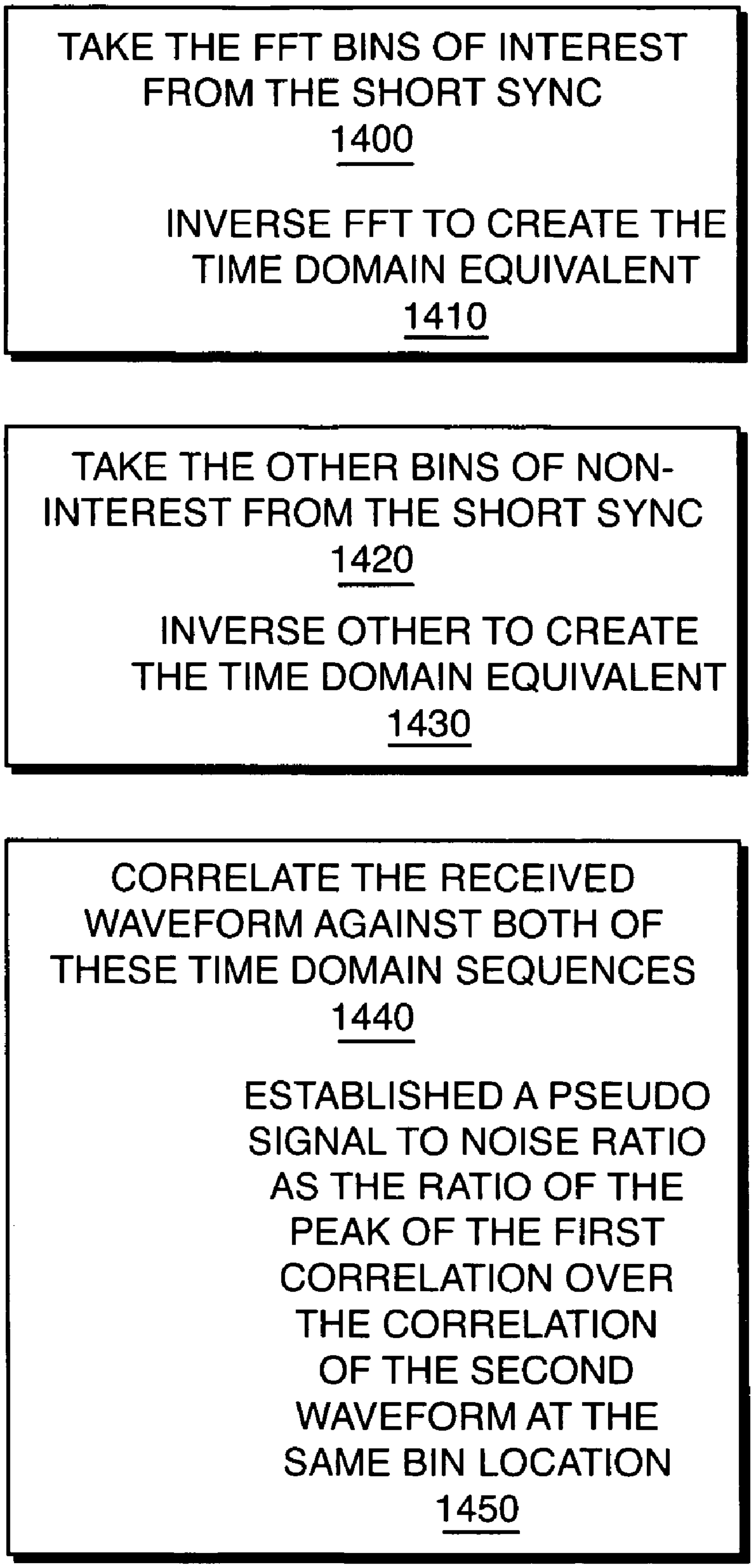
FIG. 14 is a structured English description of a third embodiment of the steering algorithm.

Yet another process shown in FIG. 14 may be used to determine a candidate antenna setting. This approach is to precompute a ideal response as a comb filter. This, in turn, allows calculation of an estimated signal to noise ratio rather than a simple best amplitude response that is used in the processes of FIGS. 12 and 13.

In step 1400, this process performs a Fast Fourier Transform (FFT) of an ideal short sync pulse. The result would typically look like the response that was seen in FIG. 6 above. At state 1410, the inverse of FFT of this ideal pulse is taken to provide an ideal time domain energy or "signal" response. Specifically, all bins with no expected energy, i.e., the 52 bins that are not expected to have any energy, are set to zero and the IFFT is run.

In state 1420 the other bins of "non-interest", that is the bins having no expected energy level, are taken from the short sync response for FFT. A "mirror" of this response is then developed with, for example, magnitude "one" values placed in the 52 bins where noise is expected and magnitude "zero" in the bins where energy is expected. The inverse FFT of this "noise filter" is then taken in state 1430 to provide a "noise" time domain response.

In state 1440 the received waveform is correlated against both of these time domain sequences, i.e., for both the "signal" and "noise" filter responses. An expected "pseudo signal to noise" ratio is developed in state 1450. This can be calculated as a ratio of a peak of the "signal" correlation divided by the peak of the "noise" correlation at each bin location.

Specifically, each of the short sync pulses received for a candidate angle are fed to be convolved with both the signal and noise filters. Taking a ratio of these two responses provides a quasi-estimate of the signal to noise ratio to be used as the metric to measure how well each antenna angle should be expected to perform.

The FFTs and inverse FFTs could be taken over 64 samples, as suggested by FIG. 6. However, it should be understood that a shorter FFT size or sample set of 32 samples could be used and still obtain measurable results. That is, if digital signal processor timing constraints allow only half as many samples for the filters, at least an energy sample and at least one noise sample for each expected peak value is available in the frequency domain. Shorter sample amounts would not be possible, at least for 802.11a, given that the twelve energy levels would not map in an integral fashion in anything less that 32 bins.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for controlling a directional angle of a steerable antenna array, wherein a radio signal received via the array contains a preamble portion and a data portion, the method comprising the steps of:

configuring the antenna array for receiving the radio signal in an omni-directional mode;

receiving an initial part of the preamble;

determining a quality metric of the initial part of the preamble;

setting the array to a candidate angle;

receiving a subsequent part of the preamble;

determining a quality metric for the subsequent part so received;

repeating the steps of setting the array, receiving a subsequent preamble part and determining a quality metric for at least one additional candidate angle; and selecting a candidate angle based on the quality metrics, wherein the preamble portion comprises short synchronization pulses and long synchronization pulses, and wherein the step of selecting a candidate angle is completed prior to reception of the long synchronization pulses.

2. A method as in claim 1 additionally comprising:

after the step of configuring the array for receiving in an omni-directional mode, but before receiving an initial part of the preamble, setting an automatic gain control.

3. A method as in claim 1 additionally comprising:

receiving additional preamble signal parts with the array set to the candidate angle.

4. A method as in claim 3 additionally comprising:

using a subsequent preamble part for frequency estimation.

5. A method as in claim 1 wherein the radio signal contains a Packet Protocol Data Unit (PPDU) frame that provides the preamble portion.

6. A method as in claim 1 wherein the radio signal contains a Physical Layer Convergent Procedure (PLCP) comprising multiple short sync pulses, the short sync pulses comprising the preamble parts.

7. A method as in claim 6 wherein the quality metric is determined by the steps of:

performing a Fast Fourier Transform (FFT) on a received short sync pulse and selecting FFT bins corresponding to a desired signal;

performing a first inverse FFT to create a time domain result of the desired signal;

selecting bins not selected in the first step of performing an FFT as bins-not-selected to provide a noise estimate;

performing a second inverse FFT on the bins-not-selected to create a time domain result of noise signals;

establishing a pseudo signal-to-noise ratio estimate as the metric, from a ratio of the two inverse FFT results.

8. A method as in claim 1 wherein the step of determining a quality metric additionally comprises:

correlating a subsequent preamble part against an expected received preamble part.

9. A method as in claim 8 wherein the expected received preamble part is a stored optimum response.

10. A method as in claim 8 wherein the expected received preamble part is recorded from a previous radio signal reception.

11. A method as in claim 1 wherein the preamble comprise a series of synchronization pulses, each pulse having a first section and a second section, the first and second pulse section having symmetry about an in-phase and quadrature time axis.

12. A method as in claim 11 wherein the step of determining a quality metric determines a quality metric for two candidate angles from a single preamble part, by determining a metric for a first candidate angle from first pulse section and determining a second candidate angle from the second pulse section.

* * * * *

UNITED STATES PATENT AND TRADEMARK OFFICE

CERTIFICATE OF CORRECTION

PATENT NO. : 7,061,427 B2 Page 1 of 1
APPLICATION NO. : 10/675583
DATED : June 13, 2006
INVENTOR(S) : John E. Hoffmann et al.

Figure 4A:
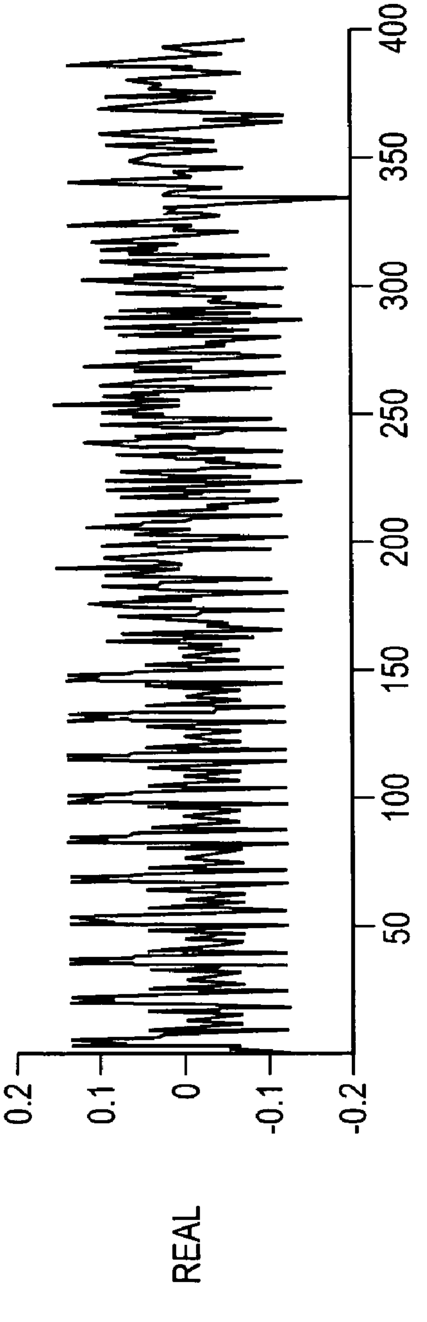
FIG. 4 is a time domain representation of the real and imaginary portions of a PLCP preamble or "short sync" pulse.
Figure 4B:
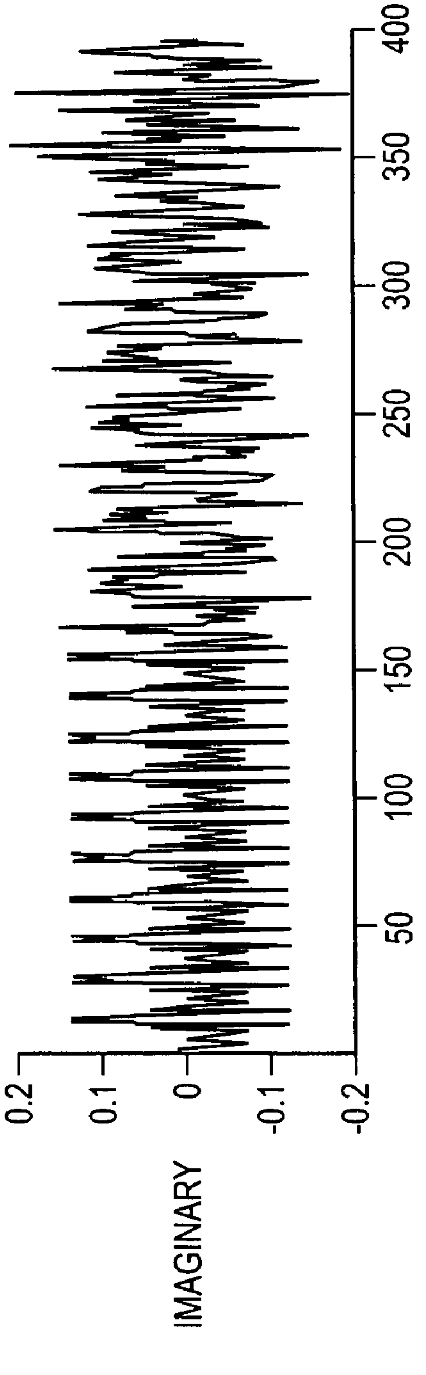
Figure 9A:
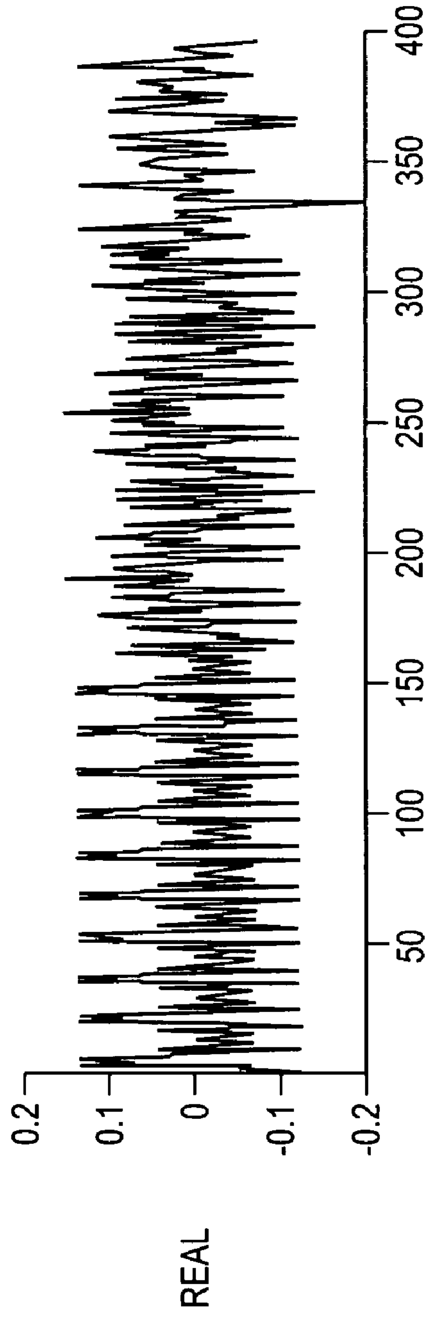
FIG. 9 is a time domain plot of a long sync pulse portion of the Physical Layer Convergent Procedure (PLCP) preamble.
Figure 9B:
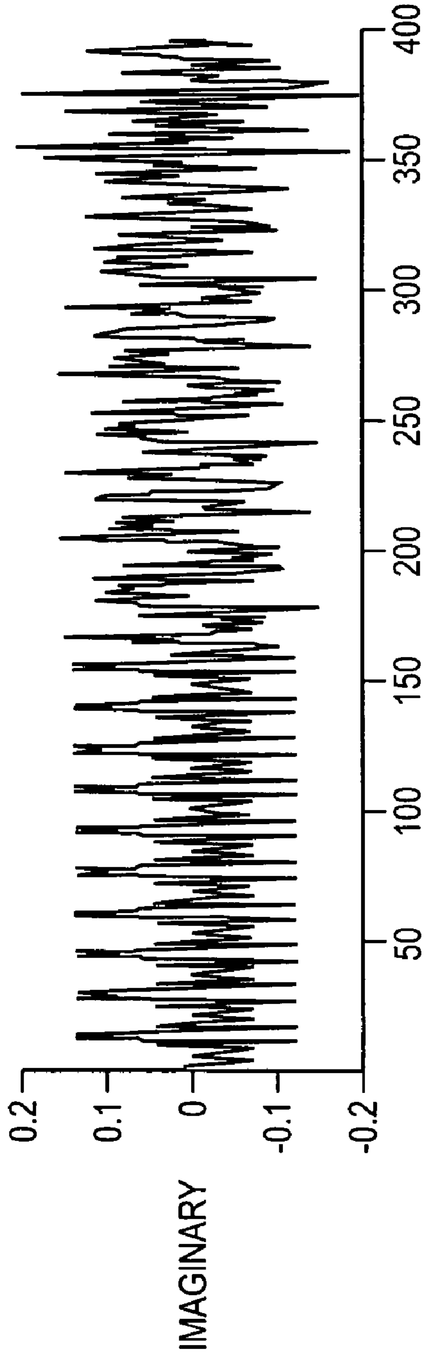

It is certified that error appears in the above-identified patent and that said Letters Patent is hereby corrected as shown below:

<u>Column 3</u>
Line 5, delete “FIG. 4 is” and insert -- FIGS. 4A-B are --;

Line 18, delete “FIG. 9 is” and insert -- FIGS. 9A-B are --.

<u>Column 5</u>
Line 26, delete “FIG. 4 in a diagram” and insert -- FIGS. 4A-B are diagrams --.

<u>Column 6</u>
Lines 8-9, delete “FIG. 9” and insert -- FIGS. 9A-B --.

Signed and Sealed this

Seventeenth Day of October, 2006

JON W. DUDAS
*Director of the United States Patent and Trademark Office*